United States Patent
Slowinski et al.

(10) Patent No.: US 6,373,467 B1
(45) Date of Patent: Apr. 16, 2002

(54) COMPUTER INPUT DEVICE HAVING PRECIOUS METAL SHELL AND PROTECTIVE BUMPER

(75) Inventors: Christopher Slowinski, Lake Success; Ernie Isaac Schindler, New York, both of NY (US)

(73) Assignee: Slowinski et al., New York (*) Notice: Subject to any disclaimer, the term of this patent is extended or adjusted under 35 U.S.C. 154(b) by 0 days.

(21) Appl. No.: 09/277,721

(22) Filed: Mar. 26, 1999

(51) Int. Cl.[7] ................................................. G09G 5/08
(52) U.S. Cl. ........................ 345/163; 345/158; D14/114
(58) Field of Search ................................. 345/163, 156, 345/157, 158; D14/114

(56) References Cited

U.S. PATENT DOCUMENTS

| | | | | |
|---|---|---|---|---|
| 5,245,146 A | * | 9/1993 | Florence | 200/333 |
| 5,280,276 A | * | 1/1994 | Kwok | 345/163 |
| 5,576,733 A | * | 11/1996 | Lo | 345/163 |
| D381,015 S | * | 7/1997 | Morrison et al. | D14/100 |
| 5,668,575 A | * | 9/1997 | Perry | 345/163 |
| 6,031,518 A | * | 2/2000 | Adams et al. | 345/156 |
| 6,040,539 A | * | 3/2000 | Hiegel | 200/302.1 |
| 6,064,370 A | * | 5/2000 | Wang et al. | 345/163 |

* cited by examiner

*Primary Examiner*—Richard Hjerpe
*Assistant Examiner*—Kimnhung Nguyen
(74) *Attorney, Agent, or Firm*—Ostrolenk, Faber, Gerb & Soffen, LLP

(57) ABSTRACT

A computer input device is provided which is laterally symmetric and which has a protective bumper to shield its precious metal outer shell from damage resulting from contact with other objects. The lateral symmetry and contoured control buttons provide an ergonomic shape suitable for use by both left-handed and right-handed persons. The invention has a base which further has an protective bumper and an upper surface in which the protective bumper extends above the upper surface. A plurality of depressible contoured control buttons are mounted on the upper surface of the base. The invention also has a housing having a plurality of openings, the housing being coupled to the base along a bottom periphery of the housing such that the protective bumper extends outward beyond the shell and extends above the bottom periphery of the housing. Each of the plurality of contoured control buttons extends though a respective one of the plurality of openings in the housing. A shell covers the outer surface of the housing and is affixed to the outer surface of the housing. The shell has a plurality of openings corresponding to the openings in the housing.

10 Claims, 5 Drawing Sheets

COMPUTER INPUT DEVICE HAVING PRECIOUS METAL SHELL AND PROTECTIVE BUMPER

BACKGROUND OF THE INVENTION

The present invention relates to a computer input device, specifically, an ergonomic computer mouse that can be used by both left and right-handed persons and which has a bumper provided on its base which protects the precious metal shell.

There are many different types of input devices used to facilitate the entry of data into a computer. One of the most popular among these input devices is the computer mouse (hereinafter "mouse"). A typical mouse is comprised of a case having a hole in the bottom through which a ball protrudes, and one or more input buttons flush with the upper surface of the case. The ball is in rotational contact with electronic components housed within the case which generate electrical signals corresponding to the movement of the mouse.

There are many different styles for input mice. However, there are no devices which can be easily operated with the left or right hand, and which are ergonomically arranged such that they are comfortable to use in either hand. In other words, mice are typically designed such that they are either comfortable to use, or are equally usable with a left hand or right hand, but not both.

For example, MICROSOFT's INTELLIMOUSE 1.1A is arranged such that it fits comfortably only when placed in a user's right hand. This results from its shape in which the case is curved such that the left side of the case is concave, and the right side of the case straight. The indentation formed by the concave shape provides a resting spot for a user's right thumb, but not for the fingers of a user's left hand.

It is desirable to have a mouse which can be used by a left-handed person or a right-handed person, and which is comfortable for either type of user.

Also, the proliferation of computers into the work place has resulted in corporate executives and business owners using personal computers as a routine part of their work day. As such, many corporate executives and business owners have personal computers in their private offices; offices which are often lavishly appointed. These individuals often want only the most aesthetically pleasing products surrounding them in their work environment, including their computing resources. This is evidenced by the proliferation of sleek, thin monitors, and stylish personal computer chassis cases. In addition, a well appointed office can act as a status symbol when entertaining business associates and clients.

While it is not uncommon for an executive to have a silver decanter, leather chair or crystal glasses, there are currently no computer mice available which can compliment a finely appointed office by providing a precious metal appearance, such as by using gold, silver, or an alloy of gold or silver. Even if there were, mouse case designs typically employ a base and an upper cover in which the periphery of the base is flush with the sides of the housing. As a result of this arrangement, the housing is not protected from damage resulting from contact with other objects, even while in use. Thus, the housing of a typical mouse is subject to scratching, chipping, and other damage. This is not an issue for typical mice which use plastic cases, because the plastic case is resilient. However, the lack of protection for the housing is an issue in the case where the outer shell material is valuable and easily damaged.

It is therefore desirable to provide a mouse which is aesthetically pleasing and which protects the outer housing from damage resulting from contact with other objects, even during normal use.

SUMMARY OF THE INVENTION

In general, it is an object of the present invention to provide a computer mouse which is comfortable when used in either the left hand or the right hand. It is also generally an object of the present invention to provide a computer mouse which uses precious metals on the outer surfaces of the shell and input buttons in which the valuable surfaces are protected from damage by a bumper integrated with the mouse base.

As such, it is an object of the present invention to provide an ergonomic computer input device in which a base has an outer lip and an upper surface, the outer lip extending above the upper surface of the base. A plurality of depressible control buttons are mounted on the upper surface of the base. A housing has a plurality of openings, the housing being coupled to the base along a bottom periphery of the housing such that the outer lip extends outward beyond the shell and extends above the bottom periphery of the housing, each of the plurality of control buttons extends though a respective one of the plurality of openings in the housing. A shell covers the outer surface of the housing and is affixed to the outer surface of the housing, the shell having a plurality of openings corresponding to the openings in the housing.

Other features and advantages of the present invention will become apparent from the following description of the invention which refers to the accompanying drawings.

Figure 1:
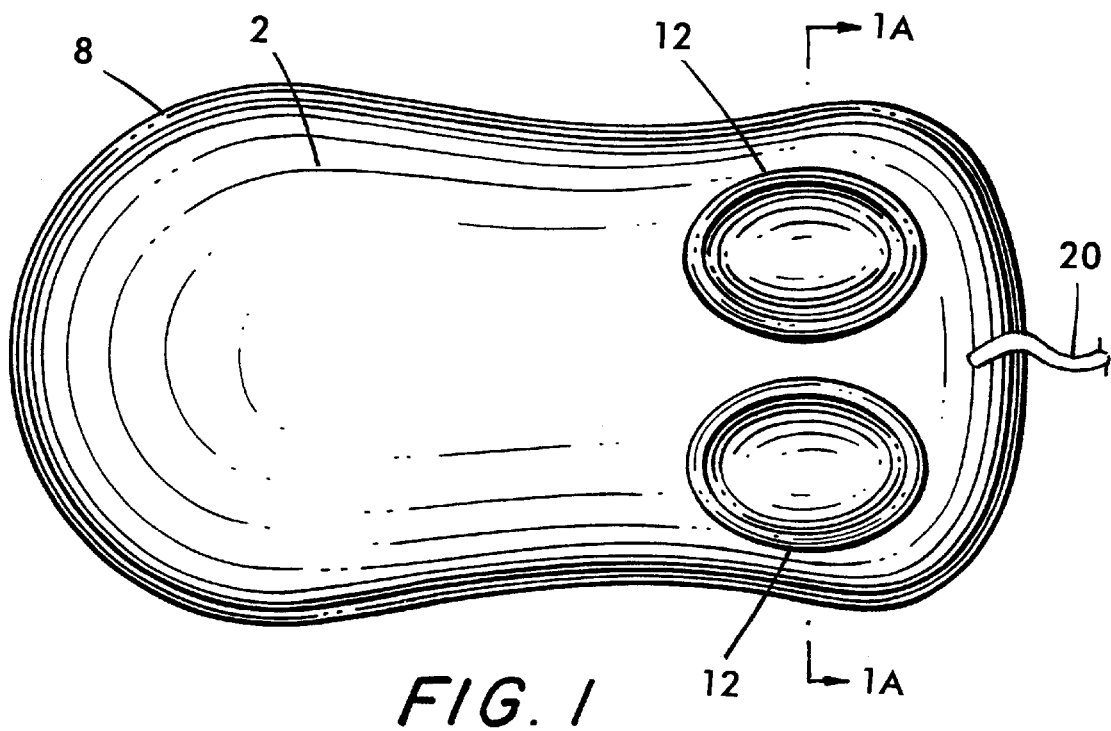
FIG. 1 is a top view of a computer input device of the present invention.

For the purpose of illustrating the invention, there is shown in the drawings a form which is presently preferred, it being understood, however, that the invention is not limited to the precise arrangement and instrumentality shown.

DETAILED DESCRIPTION OF THE INVENTION

Figure 1A:
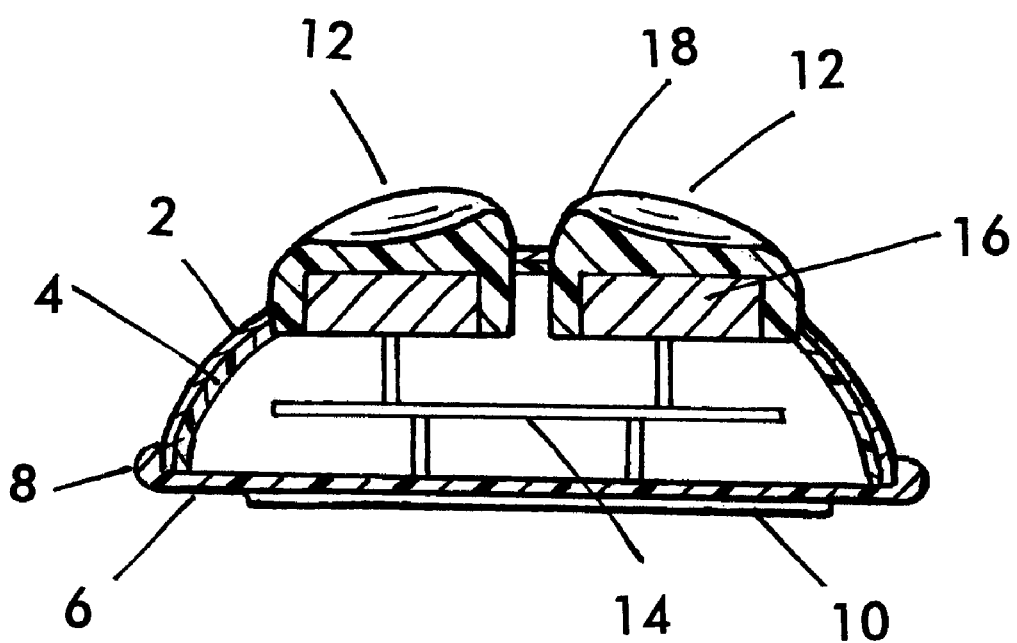
FIG. 1A is a section view as seen through section 1A—1A in FIG. 1.

As referenced in the accompanying drawings in which like reference numerals refer to like elements, FIGS. 1–6 show various views of a computer input device of the present invention. In particular, FIGS. 1 and 1A are a top view and a section view, respectively, showing outer shell 2 positioned on housing 4. Outer shell 2 and housing 4 make up the upper portion of the input device case. Base 6 forms the lower portion of the mouse casing. Base 6 is provided with lip 8 such that when outer shell 2 and housing 4 are positioned on base 6, lip 8 covers part of the lower portion of outer shell 2 and housing 4. Lip 8 extends perpendicularly outward from outer shell 2 and housing 4 such that lip 8 serves as a protective bumper, minimizing the risk that outer shell 2 will contact another object and be damaged during normal operation.

Outer shell 2 is typically a precious metal, such as gold, silver or an alloy of gold or silver. Due to the cost of these precious metals, outer shell 2 is preferably thin as compared with housing 4, such that a preferred thickness for outer shell 2 is approximately 0.030 inches. The use of a precious metal for outer shell 2 provides a rich look to the mouse. Actual support for a user's hand, however, comes from the strength imparted by housing 4. Housing 4 is a strong material such as that which may be typically found in a computer mouse, such as plastic. Base 6 is also formed of plastic as is integrated lip 8. If desired, lip 8 can be painted, dyed or colored to match the color of outer shell 2 or control buttons 12, described below. Optionally, lip 8 can be separate from base 6 and can be comprised of a softer cushioning material, such as rubber.

Mounted to the bottom side of base 6, the side facing the mouse pad, desk or work surface, are a plurality of friction reducing strips 10. Friction reducing strips 10 ease the movement of the input device, and provide the elevation of the mouse case necessary for the ball (not shown) to freely rotate, thereby allowing the control electronics (not shown) in the mouse to translate mouse movement into electronic signals.

Affixed to the upper side of base 6 are the control electronics and control buttons 12. A typical personal computer mouse uses two or three control buttons. Control buttons 12 are each attached to an actuable switch (not shown) to affect a user's input. The switches are typically mounted to a circuit board 14 which is mounted to base 6.

Control buttons 12 are a composite structure formed by a support 16 and a surface overlay 18. Support 16 forms the structural base for control button 12 and is the portion which is attached to the input switch. Surface overlay 18 surrounds support 12 on the sides and top and is affixed to support 16. Surface overlay 18 is typically a precious metal, such as gold, silver, or an alloy of gold or silver. The thickness of surface overlay 18 is preferably approximately 0.020 inches.

Control buttons 12 are arranged such that they protrude through openings in outer shell 2 and housing 4. Further, the top surface of control buttons 12 are provided with indentations substantially taking the form of concave depressions. These indentations provide a convenient and comfortable resting spot for a user's fingertips. The elevation of control buttons 12 above outer shell 2 adds further ergonomic comfort by accommodating the natural curve of a user's fingers.

Control buttons 12 are shaped such that the top surface of control buttons 12 are substantially oval shaped. Control buttons 12 are positioned so that the axis formed by the larger oval diameter is longitudinal with a user's finger when in normal use. This imparts a comfortable feel to a user. It is noted that, although control buttons 12 are shown and described as substantially oval shaped, any shape is suitable which allows a concave depression to be formed large enough to accommodate a user's fingertip.

Figure 3:
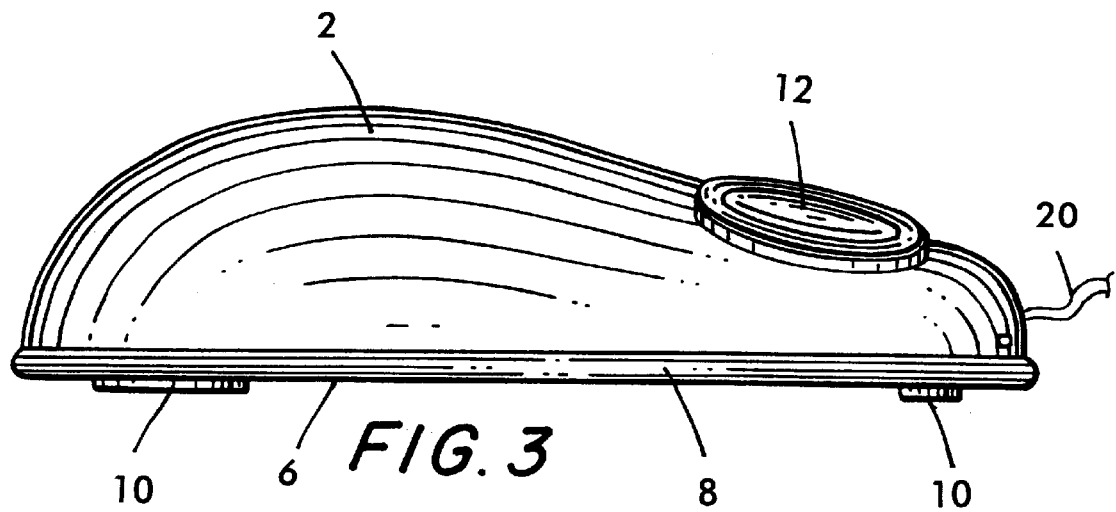
FIG. 3 is a lateral side view of the computer input device of the present invention.
Figure 4:
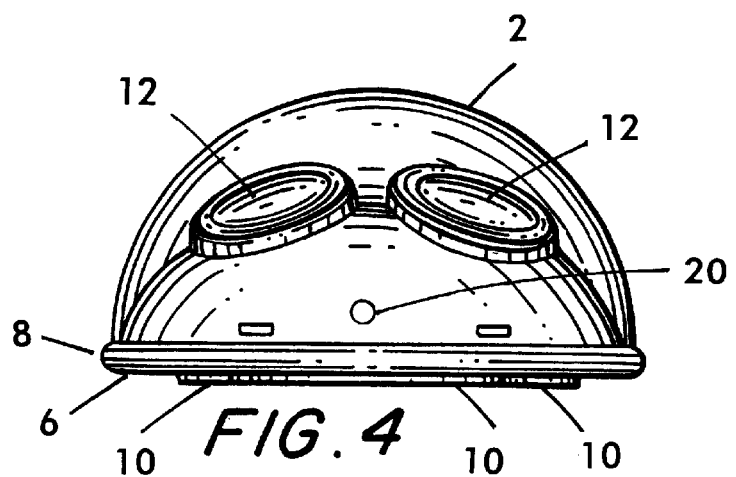
FIG. 4 is a front side view of the computer input device of the present invention.
Figure 5:
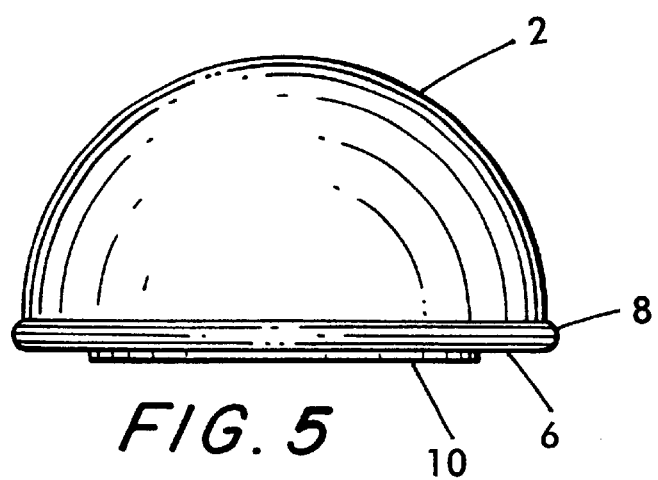
FIG. 5 is a rear side view of the computer input device of the present invention.
Figure 6:
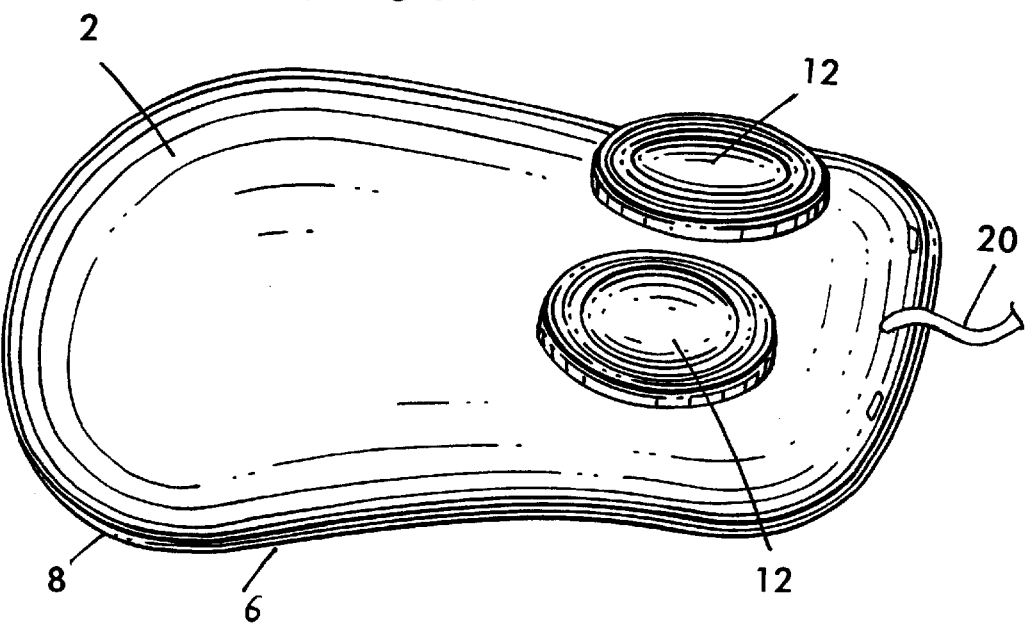
FIG. 6 is a perspective view showing the front side, lateral side and top of the computer input device of the present invention.

In addition, as shown in FIGS. 1, 1A, 4 and 5, the mouse is laterally symmetric. In other words, the device is symmetric about a plane taken longitudinally down the center length of the device, the plane being formed along a section perpendicular to that shown in FIG. 1A. This lateral symmetry allows the mouse to be used with equal ease in the left hand or the right hand of a user. Further, as shown in FIGS. 3–5, the mouse is shaped such that the rear of the mouse is hemispherical, sloping downward towards the front of the mouse. This adds further comfort for a user's hand.

Wire 20 is used to connect the mouse electronics to a computer, thereby carrying the electronic control signals generated by the mouse to a computer.

Figure 2:
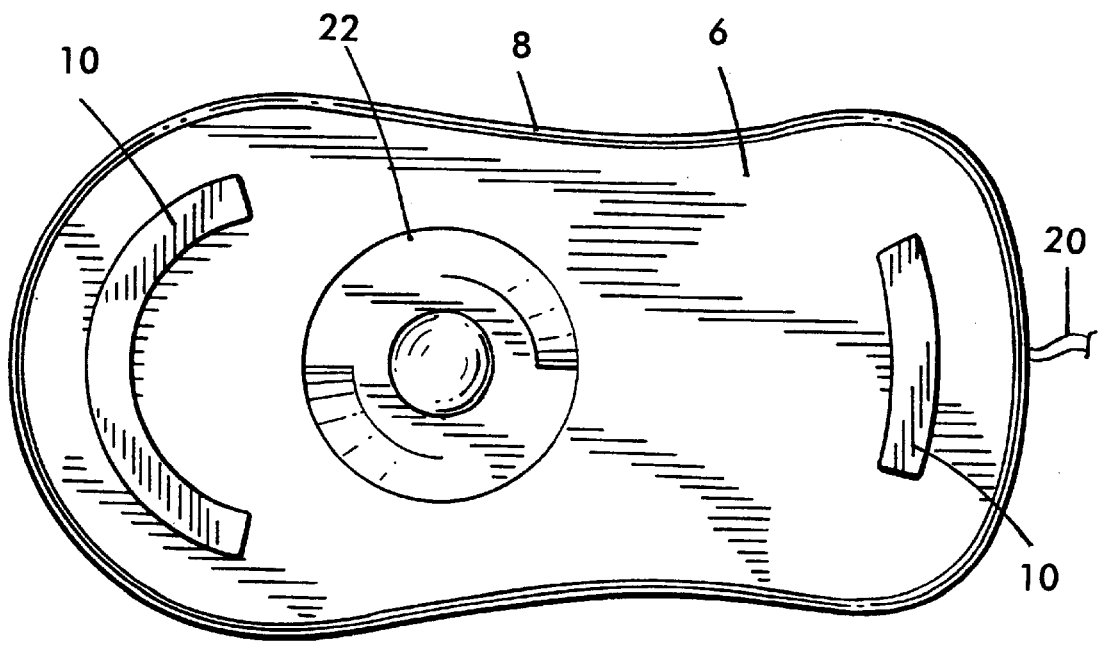
FIG. 2 is a bottom view of the computer input device of the present invention.

FIG. 2 shows a bottom view of the computer input device of the present invention. FIG. 2 clearly shows the arrangement of base 6, including lip 8, friction reducing strips 10 and the location of ball cover 22. Ball cover 22 is a removable cover which is used to contain the mouse ball, and provides access for ball removal and replacement.

Figure 7:
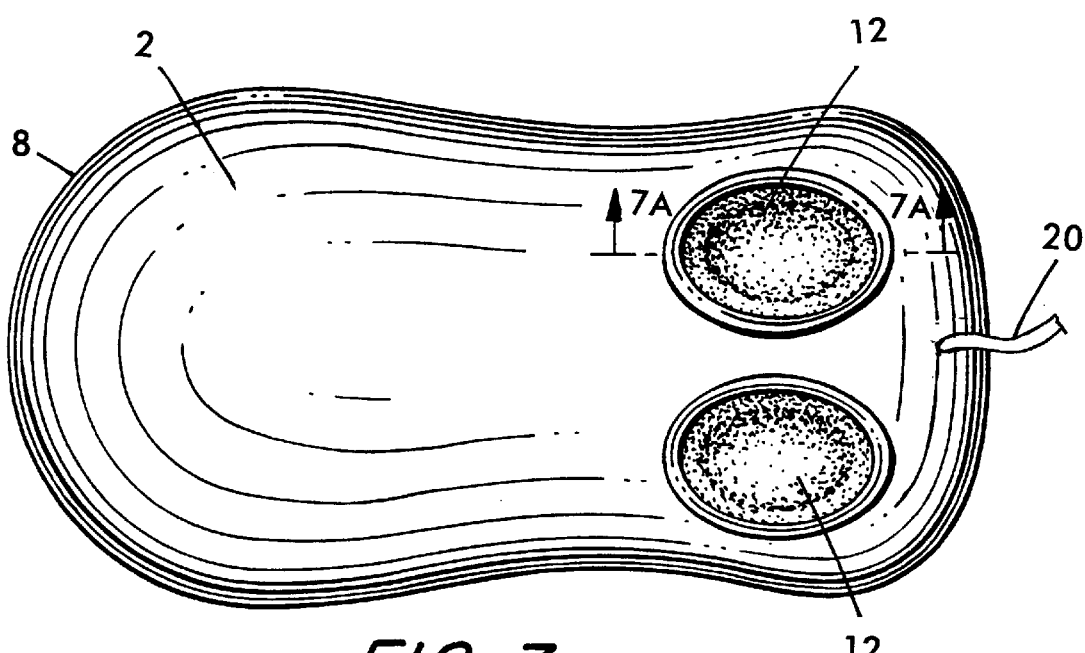
FIG. 7 is a top view of the computer input device of the present invention showing an alternate arrangement for the control buttons.
Figure 7A:
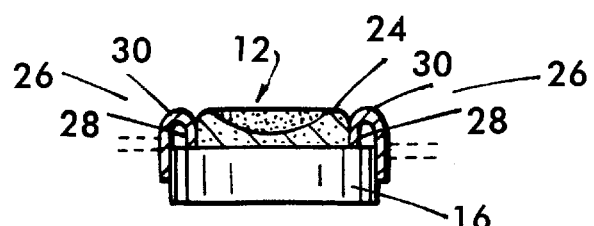
FIG. 7A is a section view as seen through section 7A—7A in FIG. 7.

FIGS. 7 and 7A show a top view and a section view, respectively, of an alternate arrangement for control buttons 12. All other aspects of the invention are as described above and shown in FIGS. 1–6. Under this alternate arrangement, surface overlay 18 is replaced with a non-metallic lustrous overlay 24 and metal surround 26. Lustrous overlay 24 is provided with the concave depression discussed above, and can be any glossy material capable of being formed or machined with the concave depression. Preferred materials for lustrous overlay 24 include stone, such as onyx, high-gloss plastic, acrylic and precious and semi-precious gems. Lustrous overlay 24 is affixed to the top of support 16 through the use of an adhesive, or other adhesion technique known to those of ordinary skill in the art.

As is shown in FIG. 7A, lustrous overly 24 is sized such that the surface area of its bottom is smaller than the surface area of support 16. In other words, the length of the major and minor axes forming the oval-shaped lustrous overlay 24 are smaller than the length of the corresponding portions of support 16. The smaller size of lustrous overlay 24, as compared with support 16, allows lustrous overlay 24 to be encircled by metal surround 26. Metal surround 26 is preferably a precious metal, such as gold, silver or an alloy of gold or silver. Metal surround 26 is formed such that inner surface 28 of metal surround 26 is affixed to the side of support 16. Metal surround 26 is shaped to form a rounded ridge along its top, thereby allowing outer surface 30 to face the side of lustrous overlay 24. A preferred thickness for metal surround 26 is 0.020 inches. Outer surface 30 can optionally be adhered to the side of lustrous overlay 24, thereby providing additional adhesive integrity for lustrous overlay 24.

The use of lustrous overlay 24 in combination with metal surround 26 imparts an elegant look to the mouse, while simultaneously maintaining the ergonomics of the inventive mouse. Also, because the materials used for lustrous overlay 24 can be expensive stones or gem stones, mounting lustrous overlay 24 to the top of support 16 allows a thin piece of material to be used for lustrous overlay 24. This reduces construction cost while maintaining the desired look of elegance and the ergonomic ambidextrous comfort resulting from the novel symmetry and control button configuration. The use of a small lustrous overlay 24 is further facilitated by the metal surround 26, which covers that portion of support 16 which extends beyond the planar dimensions of lustrous overlay 24.

Figure 8:
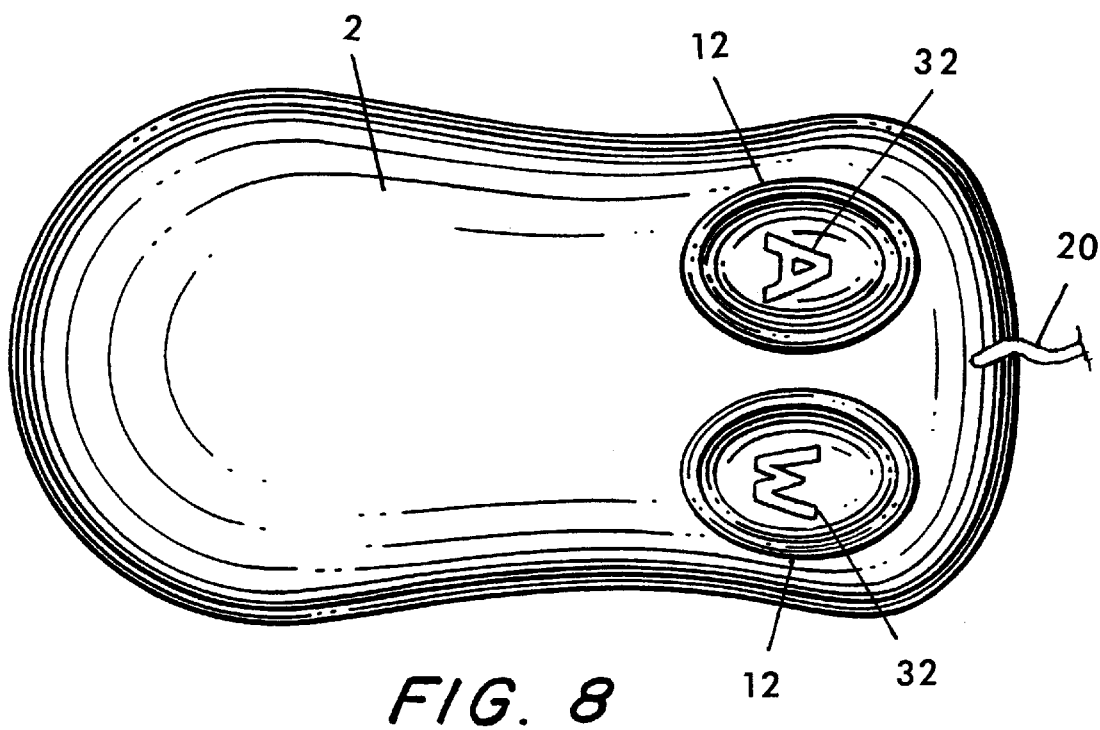
FIG. 8 is top view of the computer input device of the present invention showing alpha-numeric characters positioned on the control buttons.

FIG. 8 is a top view showing the computer input device of the present invention which still another arrangement for control buttons 12. All other aspects of the invention are the same as heretofore described. The alternate arrangement for control buttons 12 shown in FIG. 8 adds alpha-numeric characters 32 to control buttons 12, such that alpha-numeric characters 32 preferably face the user. Alpha-numeric characters 32 can be formed on control buttons 12 by engraving the character into surface overlay 18, engraving the character into lustrous overlay 24, or inlaying alpha-numeric characters 32 into the surface of lustrous overlay 24.

In the case of inlaying alpha-numeric characters 32 into lustrous overlay 24, lustrous overlay 24 is drilled or etched to provide a depressed mounting point for alpha-numeric characters 32 such that the top surface of alpha-numeric characters 32 is flush with the upper surface of lustrous overlay 24 when alpha-numeric characters 32 are inserted into the depressed region. Of course, other methods of inlaying one material into another can be used by those of ordinary skill in the art of fabricating inlayed structures.

Figure 9:
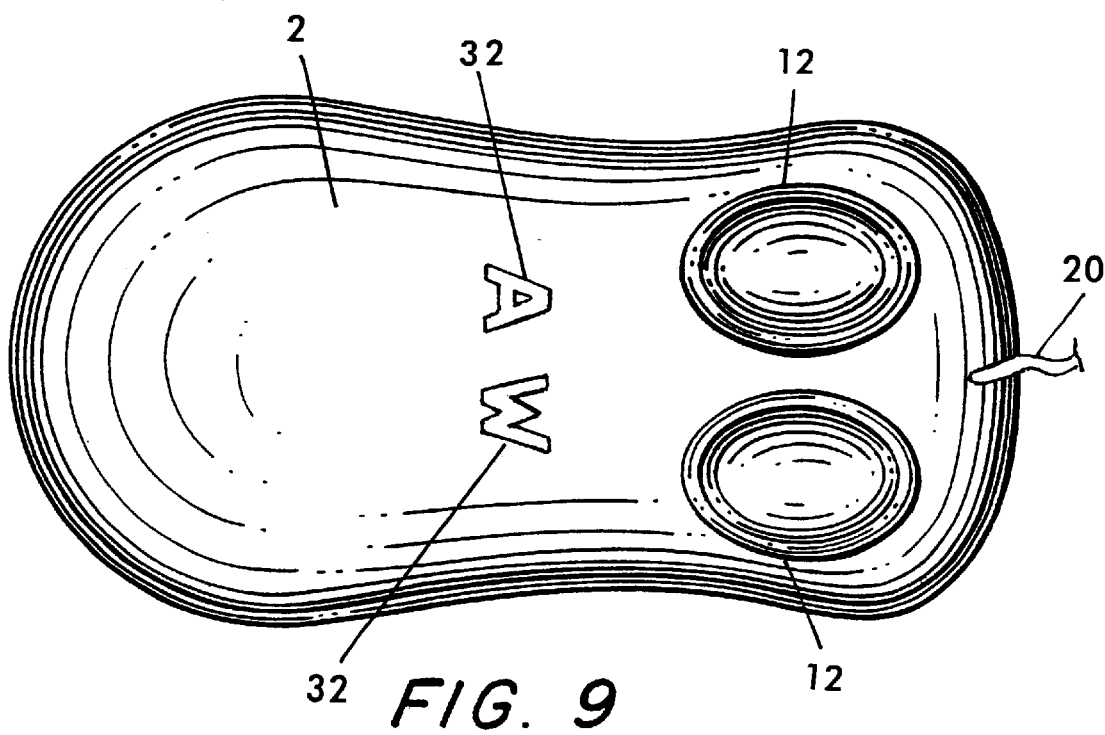
FIG. 9 is a top view of the computer input device of the present invention showing alpha-numeric characters positioned on the outer shell.

FIG. 9 shows an alternate arrangement for alpha-numeric characters 32 on outer shell 2. Under this arrangement, alpha-numeric characters 32 are engraved into the outer shell 2 in a manner such that the alpha-numeric characters 32 preferably face a user when the mouse is in its normal operating position.

The computer input device of the present invention, as described herein, provides the advantages of being ergonomic for comfortable use in either a left hand or a right hand due to its lateral symmetry and protruding concave control buttons 12. The present invention also has the advantage of being aesthetically pleasing, such that its precious metal outer shell 2 and surface overlay 18 make the invention suitable for use in an executive's office or in an environment necessitating an ornate input device. The suitability for the input device to be used in an executive's office is further enhanced through the use of lustrous overlays 24 and alpha-numeric characters 32, both of which can be optionally added as alternatives in the present invention without any detrimental effect on the ergonomics of the input device.

The expensive precious metal outer shell 2 is protected from damage by lip 8, thereby preserving the user's investment by minimizing, if not eliminating, damage due to contact with other objects and surfaces.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An ergonomic computer input device comprising:

a generally horizontally extending base having an outer lip and an upper surface, said outer lip extending above said upper surface of said base generally perpendicularly to said upper surface, said lip serving as a protective bumper, minimizing the risk that the shell will contact another object and be damaged during normal operation;

a plurality of depressible control buttons mounted on said upper surface of said base;

a housing having a plurality of openings, said housing coupled to said base along a bottom periphery of said housing such that said outer lip extends outward beyond said shell and extends above said bottom periphery of said housing, each of said plurality of control buttons extends though a respective one of said plurality of openings in said housing;

a shell made of a precious metal selected from the group consisting of: gold, silver, gold alloy, silver alloy, stone, high-gloss plastic, and acrylic covering an outer surface of said housing and affixed to said outer surface of said housing, said shell having a plurality of openings corresponding to the openings in said housing, said base is made of a non-precious material; and each of said plurality of control buttons is comprised of a support and a surface overlay, said surface overlay covering a side and upper surfaces of said support and being affixed to said support, said surface overlay being made of a material selected from the group consisting of: gold, silver, gold alloy, silver alloy, stone, high-gloss plastic, and acrylic.

2. A computer input device according to claim 1, wherein the thickness of said surface overlay is approximately 0.020 inches.

3. A computer input device according to claim 1, wherein an upper surface of said control buttons is shaped substantially as an oval.

4. A computer input device according to claim 3, wherein said upper surface of each of said plurality of control buttons has a substantially concave depression forming an indentation in said control button.

5. A computer input device according to claim 1, wherein the thickness of said shell is approximately 0.030 inches.

6. A computer input device according to claim 3, wherein said control buttons comprise:

a support; and a metallic surround having a first side and a second side opposite said first side, said first side being affixed to a side of said support, said metallic surround extending above said support and being shaped to form a rounded upper edge such that said second side faces a side of said lustrous overlay.

7. A computer input device according to claim 1, wherein said device is laterally symmetric.

8. A computer input device according to claim 1, wherein said shell further comprises alpha-numeric characters engraved into an upper surface of said shell.

9. A computer input device according to claim 1, wherein said shell further comprises the lustrous material inlayed into an upper surface of said shell.

10. A computer input device according to claim 1, wherein said surface overlay comprises alpha-numeric characters engraved into an upper surface of said surface overlay.

* * * * *